(12) United States Patent
Endo et al.

(10) Patent No.: US 8,136,206 B2
(45) Date of Patent: Mar. 20, 2012

(54) BIAXIAL HINGE DEVICE AND PORTABLE TERMINAL DEVICE

(75) Inventors: Isao Endo, Kanagawa (JP); Tsutomu Takahashi, Kanagawa (JP)

(73) Assignee: SONY Ericsson Mobile Communications Japan, Inc., Tokyo (JP)

(*) Notice: Subject to any disclaimer, the term of this patent is extended or adjusted under 35 U.S.C. 154(b) by 403 days.

(21) Appl. No.: 12/499,181

(22) Filed: Jul. 8, 2009

(65) Prior Publication Data
US 2010/0005627 A1    Jan. 14, 2010

(30) Foreign Application Priority Data
Jul. 14, 2008 (JP) ................ P2008-182407

(51) Int. Cl.
*E05D 3/10* (2006.01)
(52) U.S. Cl. .................................... 16/367
(58) Field of Classification Search .......... 016/367, 016/386, 338–340, 330, 303, 380; 361/679.06, 361/679.27, 679.28, 679.11, 679.12, 679.13; 379/433.12, 433.13; 455/575.1, 575.4, 575.8, 455/550.1, 90.3; 348/373, 333.06, 794; 248/291.1, 248/292.12, 292.13, 919–923
See application file for complete search history.

(56) References Cited

U.S. PATENT DOCUMENTS

| 7,150,074 B2* | 12/2006 | Shiba ................... 16/367 |
| 7,168,136 B2* | 1/2007 | Gan .................... 16/367 |
| 7,711,112 B2* | 5/2010 | Satoh et al. ........ 379/433.13 |
| 8,042,231 B2* | 10/2011 | Bae et al. ............. 16/367 |
| 2005/0160558 A1* | 7/2005 | Kim .................... 16/367 |
| 2006/0048338 A1* | 3/2006 | Lowry et al. ......... 16/367 |
| 2007/0033771 A1* | 2/2007 | Hung .................. 16/367 |
| 2008/0034549 A1* | 2/2008 | Lee et al. ............. 16/367 |
| 2008/0078062 A1* | 4/2008 | Hsu et al. ............. 16/367 |
| 2008/0204985 A1* | 8/2008 | Bae et al. ............. 361/681 |

FOREIGN PATENT DOCUMENTS

| EP | 1 630 331 A2 | 3/2006 |
| EP | 1 630 331 A3 | 3/2006 |
| EP | 1 715 660 A1 | 10/2006 |
| JP | 2005-198062 | 7/2005 |

* cited by examiner

*Primary Examiner* — Chuck Y. Mah
(74) *Attorney, Agent, or Firm* — Oblon, Spivak, McClelland, Maier & Neustadt, L.L.P.

(57) ABSTRACT

A biaxial hinge device includes: a first-shaft member; a second-shaft member orthogonal to the first-shaft member; a thrust-cam member provided to the second-shaft member so as to move in the extending direction of the second-shaft member; a rotational-arm member provided to the second-shaft member so as to move rotationally; a protrusion provided to the thrust-cam member so as to protrude to the rotational-arm member side; a groove provided to the rotational-arm member, into which the protrusion is fitted; and an fitting/fitting-release control portion provided to the first-shaft member which releases fitting of the protrusion into the groove when the rotational angle of the second-shaft member as to the first-shaft member is a first-rotational angle, and moves the thrust-cam member to the rotational-arm member side to fit the protrusion into the groove when the rotational angle of the second-shaft member as to the first-shaft member is a second-rotational angle.

7 Claims, 15 Drawing Sheets

BIAXIAL HINGE DEVICE AND PORTABLE TERMINAL DEVICE

BACKGROUND OF THE INVENTION

1. Field of the Invention

The present invention relates to a biaxial hinge device suitably applied to cellular telephone devices, PHS (Personal Handyphone System) telephone devices, PDA (Personal Digital Assistant) devices, portable game devices, notebook computers, and so forth, which have a hinge portion enabling opening/closing of a housing, for example, and to a portable terminal device.

More specifically, the present invention relates to a biaxial hinge device and to a portable terminal device which enable the number of springs used to be reduced to one while including two rotational shafts of a first rotational shaft and second rotational shaft, thereby realizing reduction in size by an amount equivalent to that of the reduced springs, and which enable space for wiring a cable to be omitted by employing a first barrel-shaped shaft member making up a first rotational shaft, and a second barrel-shaped shaft member making up a second rotational shaft, and performing wiring of a cable or the like through each hole portion of the first shaft member and second shaft member, thereby realizing reduction in size.

2. Description of the Related Art

Japanese Unexamined Patent Application Publication No. 2005-198062 (pp. 8-9, FIG. 5) discloses in a clamshell type cellular telephone device having three folding functions which are a function of opening/closing in the longitudinal direction of an upper housing, a function of opening/closing in the lateral direction, and a function of folding in a state of the front and back of the upper housing having been inverted.

This clamshell type cellular telephone device has a hinge portion configured separately of a first hinge portion and a second hinge portion. The first hinge portion has a first rotational shaft rotatably supporting the first hinge portion itself as to a lower housing, and a second rotational shaft rotatably supporting the second hinge portion as to the first hinge portion, with the first rotational shaft and the second rotational shaft disposed in a mutually orthogonal arrangement. The second hinge portion is provided with a third rotational shaft which rotationally supports the upper housing as to the second hinge portion, such that the second rotational shaft is disposed orthogonal to the second rotational shaft. Accordingly, the upper housing can be rotated on each of the rotational shaft directions of the first rotational shaft, second rotational shaft, and third rotational shaft.

SUMMARY OF THE INVENTION

However, in the case of the clamshell type cellular telephone device disclosed in Japanese Unexamined Patent Application Publication No. 2005-198062, electric components such as a liquid crystal display unit and so forth provided within the upper housing, and electric components such as a circuit substrate and so forth provided within the lower housing have to be connected electrically, and accordingly, a harness, flexible substrate for realizing connection of the electric components of both have to be disposed by way of a hinge device. Accordingly, there has been a problem wherein space for disposing such a harness and flexible substrate has to be provided, and the hinge device increases in size by an amount equivalent to that of this space.

Note that, in the event that the hinge device increases in size, the hinge device protrudes from the housing greatly, and accordingly, there is a possibility that the hinge device might cause radio wave disturbance.

It has been found to be desirable to provide a biaxial hinge device and a portable terminal device, realizing contribution to reduction in size of a biaxial hinge portion by enabling space for disposing a harness and flexible substrate to be omitted.

An according to an embodiment of the present invention, a biaxial hinge device includes: an approximately barrel-shaped first shaft member making up a first rotational shaft; an approximately barrel-shaped second shaft member making up a second rotational shaft orthogonal to the first rotational shaft; a rotational connecting portion which connects the second shaft member to the first shaft member so as to move rotationally the second shaft member along the first rotational shaft made up of the first shaft member; a thrust cam member provided to the second shaft member so as to move in the extending direction of the second shaft member; a rotational arm member provided to the second shaft member so as to move rotationally along the second rotational shaft made up of the second shaft member; n contact protrusion provided to the thrust cam member so as to protrude to the first shaft member side at the time of the thrust cam member being provided to the second shaft member; a fitting protrusion provided to the thrust cam member so as to protrude to the rotational arm member side at the time of the thrust cam member being provided to the second shaft member; a fitting groove provided to the rotational arm member, into which the fitting protrusion provided to the thrust cam member is fitted at the time of the thrust cam member moving to the rotational arm member side; and a fitting/fitting-release control portion provided to the first shaft member which releases fitting of the fitting protrusion of the thrust cam member into the fitting groove of the rotational arm member in a case where the rotational angle of the second shaft member as to the first shaft member is a first rotational angle, and moves the thrust cam member to the rotational arm member side by way of the contact protrusion of the thrust cam member to fit the fitting protrusion of the thrust cam member into the fitting groove of the rotational arm member in a case where the rotational angle of the second shaft member as to the first shaft member is a second rotational angle.

The rotational arm member can move rotationally along the second rotational shaft made up of the second shaft member, and a housing is fixed to the rotational arm member, whereby the housing thereof can move rotationally along the second rotational shaft.

Also, the second shaft member is connected to the first shaft member by the rotational connecting portion such that the second shaft member can move rotationally along the first rotational shaft made up of the first shaft member, whereby the housing fixed to the rotational arm member can move rotationally along the first rotational shaft.

In a case where the rotational angle of the second shaft member as to the first shaft member is a first rotational angle, the fitting/fitting-release control portion releases the fitting between the fitting protrusion of the thrust cam member and the fitting groove of the rotational arm member (fitting-released state). In this fitting-released state, rotation of the rotational arm member on the second rotational axis formed of the second shaft member, and rotation of the second shaft member on the first rotational axis formed of the first shaft member, are enabled.

Conversely, in a case where the rotational angle of the second shaft member as to the first shaft member is a second rotational angle, the fitting/fitting-release control portion moves the thrust cam member to the rotational arm member side by way of the contact protrusion of the thrust cam member to fit the fitting protrusion of the thrust cam member into the fitting groove of the rotational arm member (fitting state). Thus, the rotational angle of the second shaft member as to the first shaft member is restricted with the second rotational angle.

With the above configurations according to an embodiment of the present invention, the first shaft member and second shaft member making up the respective rotational shafts are configured in a barrel shape. This enables a harness and flexible substrate to dispose through the hole portions within each shaft member, and accordingly, space for disposing the harness and flexible substrate can be omitted from the biaxial hinge device to which an embodiment of the present invention has been applied. Thus, reduction in size of the biaxial hinge device to which an embodiment of the present invention has been applied can be realized by an amount equivalent to that of the space where the harness and flexible substrate are disposed being eliminated.

With the present invention, the first shaft member and second shaft member making up the respective rotational shafts are configured in a barrel shape, which enables a harness and flexible substrate to be disposed through the hole portion within each shaft member. Accordingly, space for disposing the harness and flexible substrate can be omitted from the biaxial hinge device to which an embodiment of the present invention has been applied, and thus, reduction in size of the biaxial hinge device to which an embodiment of the present invention has been applied can be realized by an amount equivalent to that of the space where the harness and flexible substrate are disposed being eliminated.

Also, reduction in size of the biaxial hinge device to which an embodiment of the present invention has been applied can be realized, whereby the protrusion amount of the biaxial hinge device to be protruded from the housing of an electronic device or the like can be reduced, and inconvenience can be prevented wherein the biaxial hinge device protrudes from the housing thereof to cause radio wave disturbance.

DESCRIPTION OF THE PREFERRED EMBODIMENTS

The present invention can be applied to a clamshell type cellular telephone device which enables longitudinal opening and lateral opening of a housing.

First Embodiment

Configuration of Cellular Telephone Device

Figure 1:
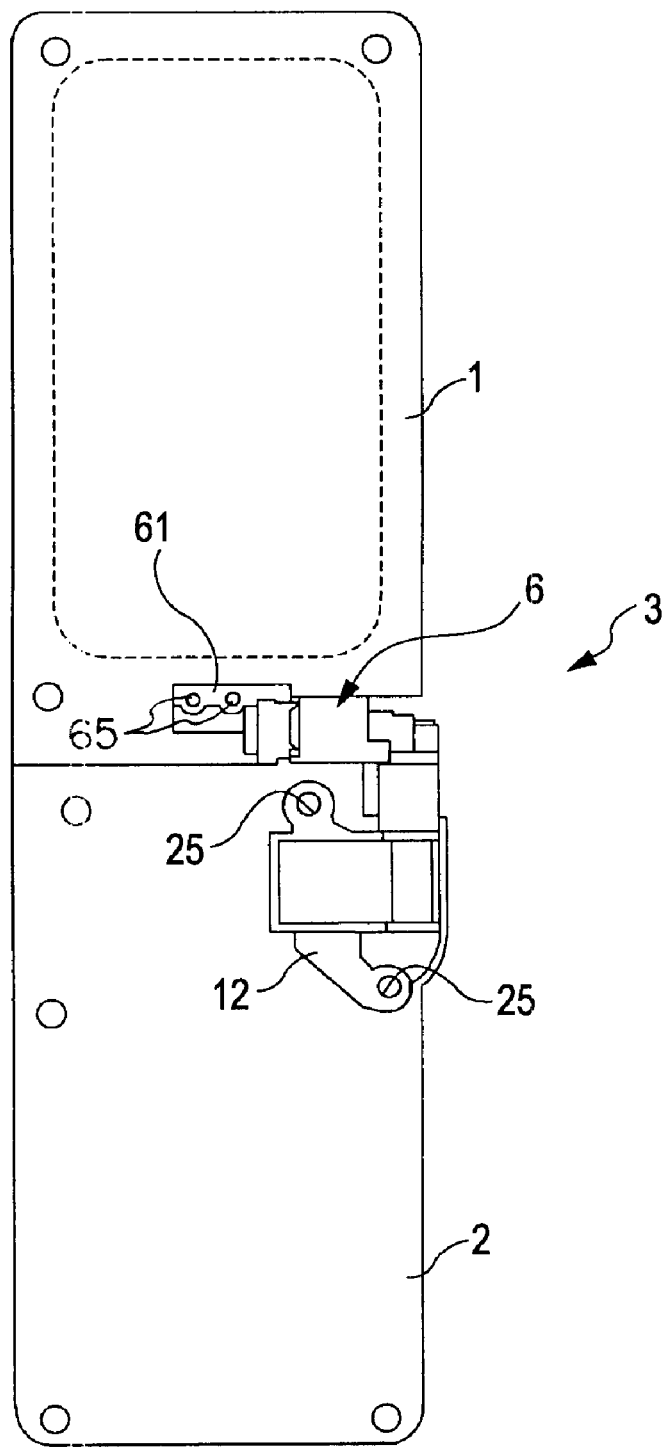
FIG. 1 is a perspective view of a cellular telephone device to which an embodiment of the present invention has been applied, in a longitudinally-opened state.
Figure 2:
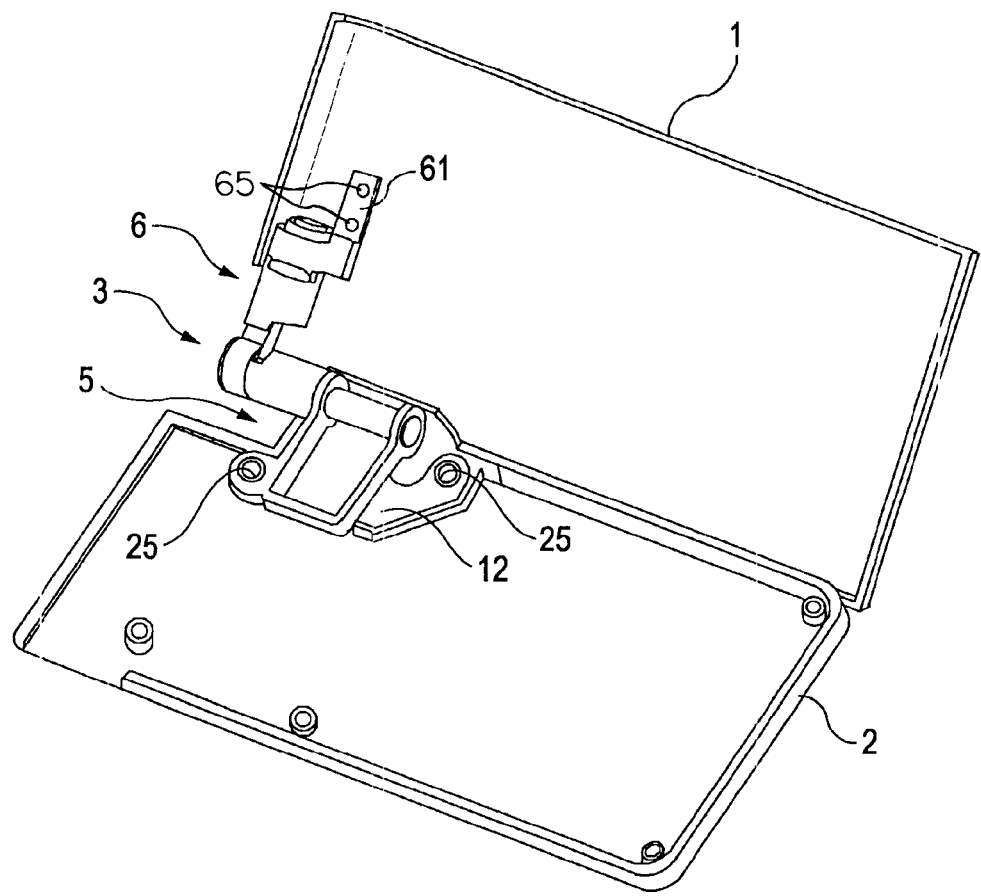
FIG. 2 is a perspective view of the cellular telephone device according to the embodiment, in a laterally-opened state.
Figure 3:
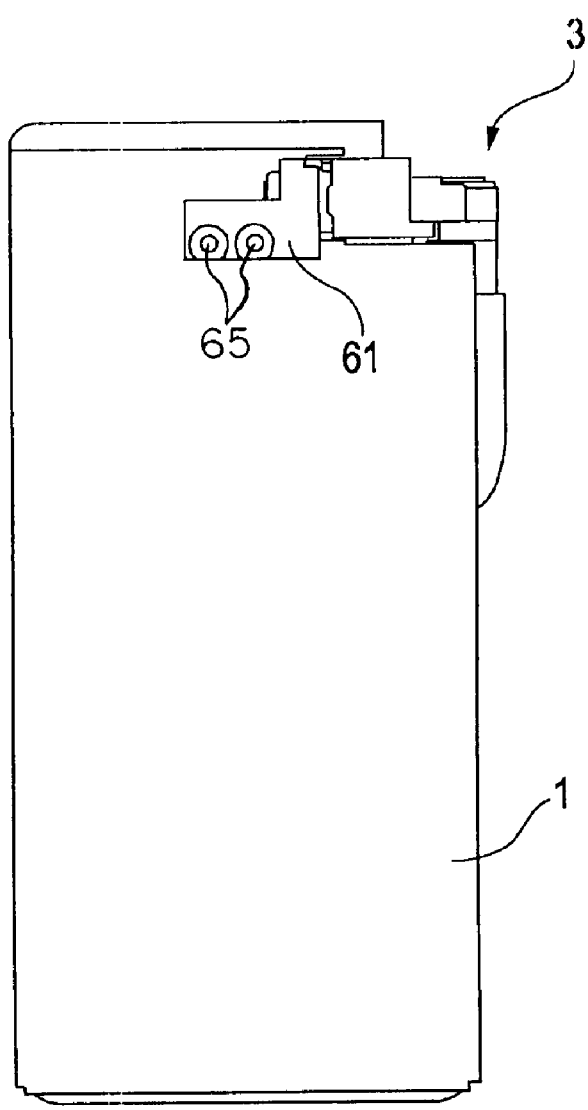
FIG. 3 is a perspective view of the cellular telephone device according to the embodiment, in a closed state.

FIG. 1 is a perspective view of a cellular telephone device to which an embodiment of the present invention has been applied, in a longitudinally-opened state, FIG. 2 is a perspective view of the cellular telephone device according to the embodiment, in a laterally-opened state, and FIG. 3 is a perspective view of the cellular telephone device according to the embodiment, in a closed state. FIGS. 1 through 3 are views in a state in which a display unit, operating unit, and so forth are removed such that a hinge portion 3 can be viewed visually.

As shown in FIGS. 1 through 3, the cellular telephone device according to the embodiment has an upper housing 1 in which is provided a display unit such as a liquid crystal display unit or organic EL (Electro Luminescence) display unit, a lower housing 2 where operating units such as rotational operation keys and numerical keys and the like are disposed, and a biaxial hinge portion 3 enabling the upper housing 1 and the lower housing 2 to be opened/closed longitudinally to a longitudinally opened state and laterally to a laterally opened state on approximately orthogonal rotational axes.

Configuration of Biaxial Hinge Portion

Figure 4:
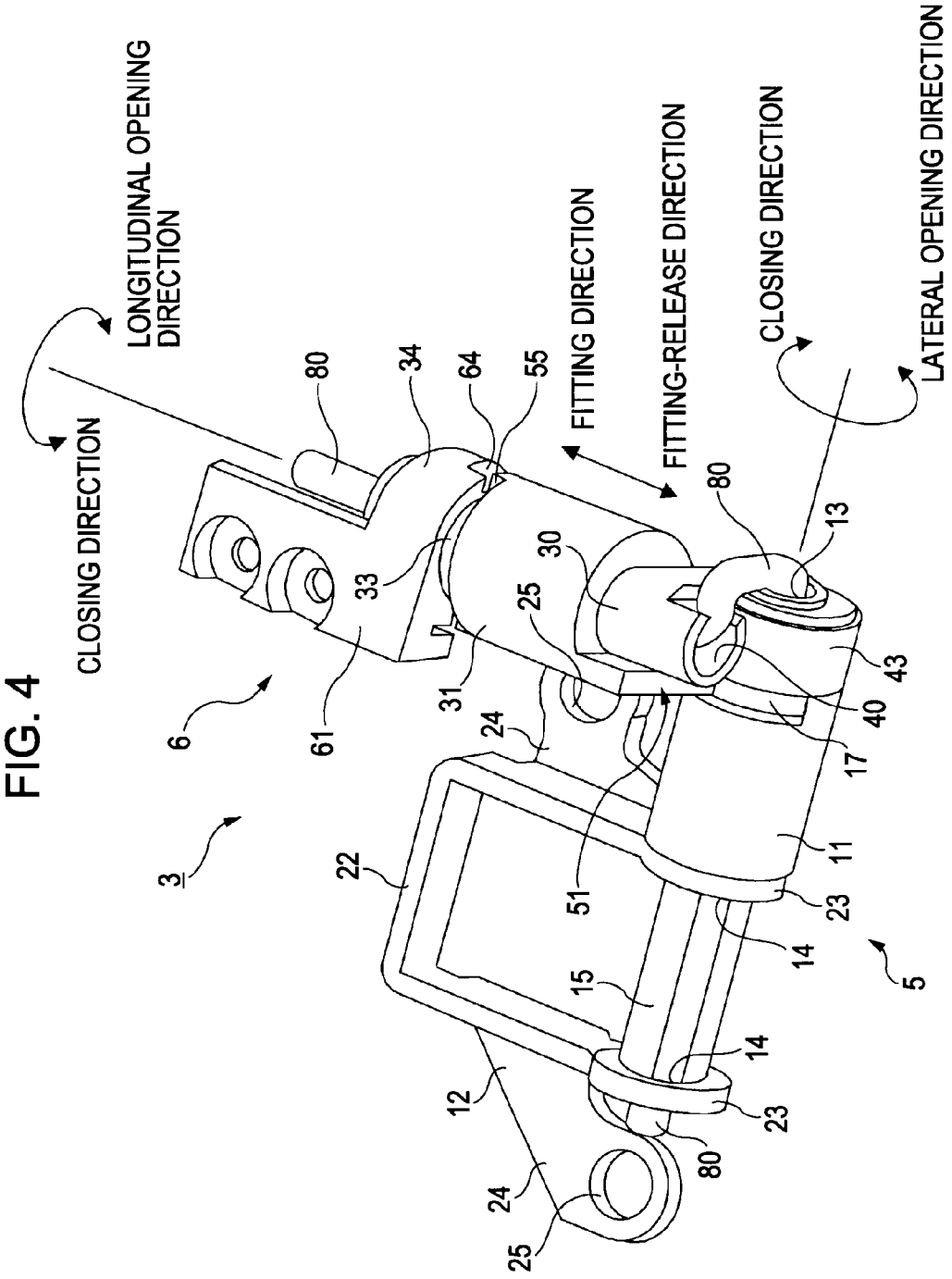
FIG. 4 is a perspective view of a biaxial hinge portion provided to the cellular telephone device according to the embodiment.

The biaxial hinge portion 3 is formed, as shown in FIG. 4, by connecting one end portion of a lateral opening rotational shaft mechanism 5 serving as a rotational shaft at the time of the upper housing 1 and lower housing 2 being operated in a laterally-opened state, and one end portion of a longitudinal opening rotational shaft mechanism 6 serving as a rotational shaft at the time of the upper housing 1 and lower housing 2 being operated in a longitudinally-opened state such that the rotational shafts of the mechanisms 5 and 6 are approximately orthogonal.

Configuration of Lateral Opening Rotational Shaft Mechanism

The lateral opening rotational shaft mechanism 5 includes, as shown in FIG. 2, a first shaft member 11 serving as a rotational shaft (longitudinal rotational shaft) at the time of the cellular telephone device being set to a laterally-opened state, and a fixing frame 12 for fixing the biaxial hinge portion 3 to the lower housing 2 with screws or the like.

Configuration of First Shaft Member

Figure 5:
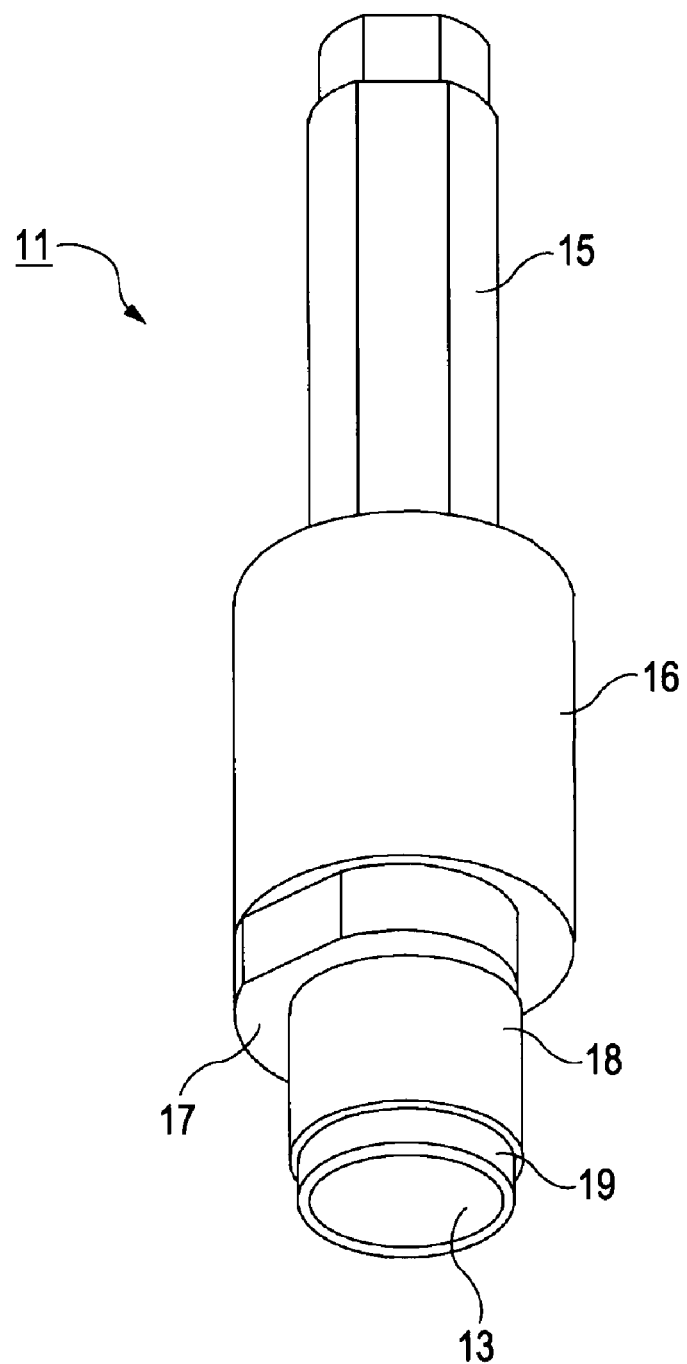
FIG. 5 is a perspective view of a first shaft member provided to the biaxial hinge portion.
Figure 6:
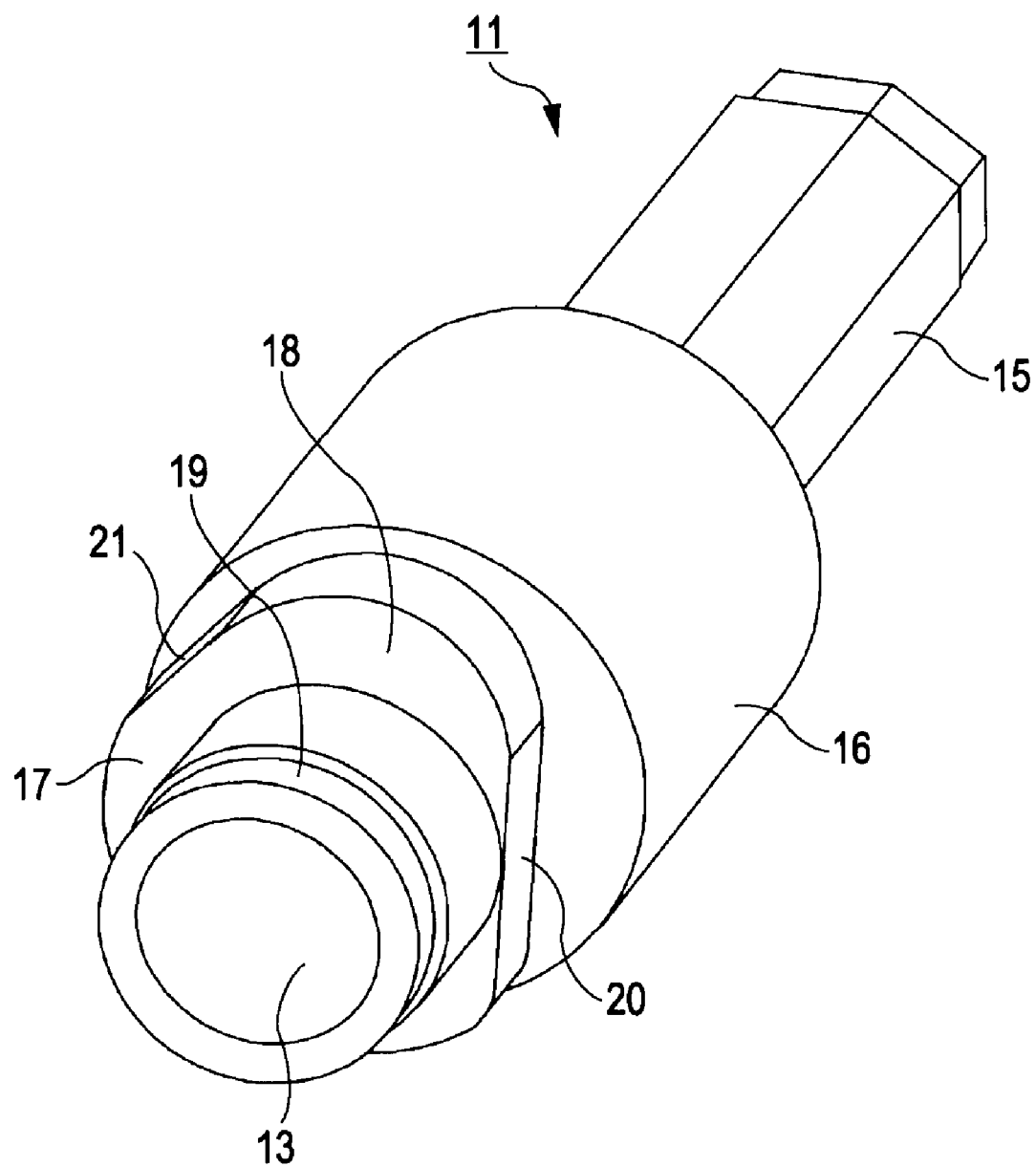
FIG. 6 is another perspective view of the first shaft member provided to the biaxial hinge portion.

The first shaft member 11 has an approximately barrel shape including a hole portion 13 communicating in the extending direction thereof, such as shown in the perspective views in FIGS. 5 and 6. The first shaft member 11 includes, as shown in FIG. 4, a frame inserting portion 15 which is a portion to be inserted into a fixing supporting hole portion 14 of the fixing frame 12, and a fixing frame contact portion 16 having a greater diameter than the frame inserting portion 15, and at the time of inserting the frame inserting portion 15 into the fixing supporting hole portion 14 of the fixing frame 12 coming into contact with the fixing frame 12, thereby preventing insertion of the frame inserting portion 15 at or above the fixing frame 12.

The frame inserting portion 15 of the first shaft member 11 has been subjected to D-cutting where the radial cross-sectional face becomes a D-shape, or polygonal-cutting where the radial cross-sectional face becomes a polygonal shape. Also, though description will be made later, the fixing supporting hole portion 14 of the fixing frame 12 shown in FIG. 4 is a hole portion having a shape corresponding to D-cutting or polygonal-cutting. Accordingly, as shown in FIG. 4, when inserting the frame inserting portion 15 of the first shaft member 11 into the fixing supporting hole portion 14 of the fixing frame 12, the first shaft member 11 is fixed and supported by the fixing frame 12 so as not to rotate.

Also, the first shaft member 11 includes a rotational amount restricting portion 17 for restricting an opened angle at the time of lateral opening of the cellular telephone device thereof to around 120 degrees for example, a longitudinal opening rotational shaft mechanism supporting portion 18 for rotatably supporting the longitudinal opening rotational shaft mechanism 6 as to the first shaft member 11, and a protruding piece portion contact portion 19 where a rotational supporting protruding piece portion (reference numeral 48 in FIG. 9) provided to a later-described second shaft member comes into contact therewith along the circumferential direction thereof.

Figure 7:
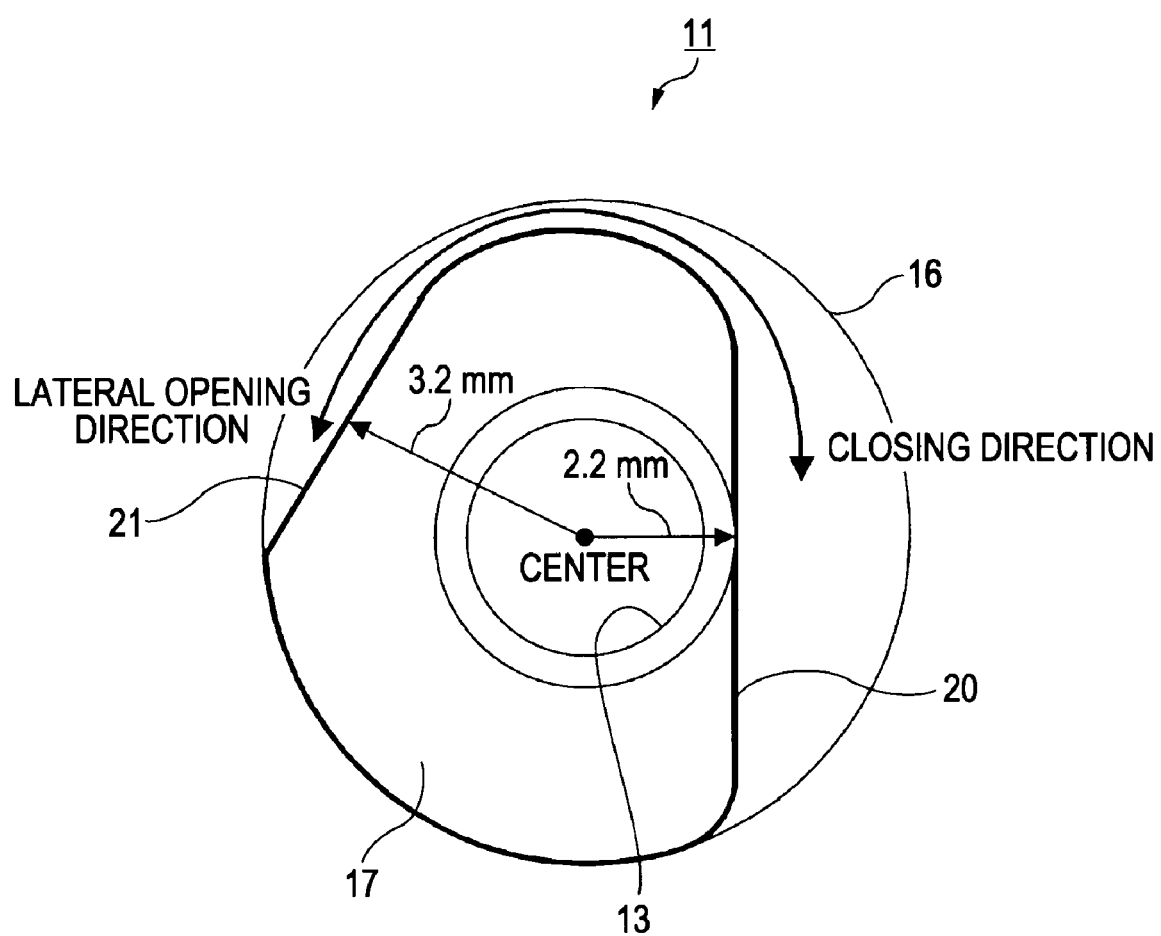
FIG. 7 is a front view of a rotational amount restricting portion provided to the first shaft member of the biaxial hinge portion as viewed from the front.

FIG. 7 illustrates the front view of the rotational amount restricting portion 17 as viewed from the hole portion 13 side of the first shaft member 11. As can be understood from FIG. 7, the rotational amount restricting portion 17 has an approximately triangular shape as viewed from the front, wherein a portion equivalent to the bottom portion of this triangular shape has an approximately ⅓ circular shape along the outer circumferential portion of the fixing frame contact portion 16. Also, when the cellular telephone device is in a closed state, a portion equivalent to the right side portion of the rotational amount restricting portion 17 having this triangular shape serves as a contact face portion 20 at the time of a closed state in which a later-described thrust cam member (reference numeral 31 in FIG. 8) is in contact therewith, and when the cellular telephone device is operated to obtain a laterally-opened state of around 120 degrees for example, a portion equivalent to the left side portion of the rotational amount restricting portion 17 having this triangular shape serves as a contact face portion 21 at the time of an opened state in which a later-described thrust cam member (reference numeral 31 in FIG. 8) is in contact therewith.

Each of the contact face portions 20 and 21 is formed by linear notch-cutting, wherein distance from the center of the hole portion 13 of the first shaft member 11 to the contact face portion 20 at the time of a closed state is, for example, 2.2 mm, but distance from the center of the hole portion 13 of the first shaft member 11 to the contact face portion 21 at the time of an opened state is, for example, 3.2 mm.

That is to say, the distance from the center of the hole portion 13 of the first shaft member 11 to the contact face portion 20 at the time of a closed state is longer than the distance from the center of the hole portion 13 to the contact face portion 21 at the time of an opened state. Though description will be made later, in the case of the cellular telephone device according to the present embodiment, the opened angle (rotational angle) at the time of lateral opening operations is restricted based on the difference of the distance from the center of the hole portion 13.

Configuration of Fixing Frame

The fixing frame 12 includes, as shown in FIG. 4, a frame body 22 of which the shape is a rectangular shape excluding the left side, shaft supporting portions 23 provided to both end portions of the frame body 22 so as to face mutually, and fixing portions 24 provided adjacent to both shaft supporting portions 23 so as to protrude from the frame body 22 in the rotational axis direction.

A fixing supporting hole portion 14 into which the frame inserting portion 15 of the first shaft member 11 is inserted is provided to the shaft supporting portions 23 provided to both end portions of the frame body 22 so as to face mutually. As described above, the frame inserting portion 15 of the first shaft member 11 has been subjected to, for example, D-cutting where the radial cross-sectional face becomes a D-shape, or polygonal-cutting where the radial cross-sectional face become a polygonal shape. Accordingly, the fixing supporting hole portion 14 of each of the shaft supporting portions 23 is a hole portion having a shape corresponding to D-cutting or polygonal-cutting, and upon the frame inserting portion 15 of the first shaft member 11 being inserted, fixes and supports the first shaft member 11 so as not to rotate.

Also, each of the fixing portions 24 provided to the frame body 22 has a screw hole 25. The fixing frame 12 is screwed to the lower housing 2 with screws through the screw holes 25 such as shown in FIGS. 1 and 2.

Configuration of Longitudinal Opening Rotational Shaft Mechanism

Figure 8:
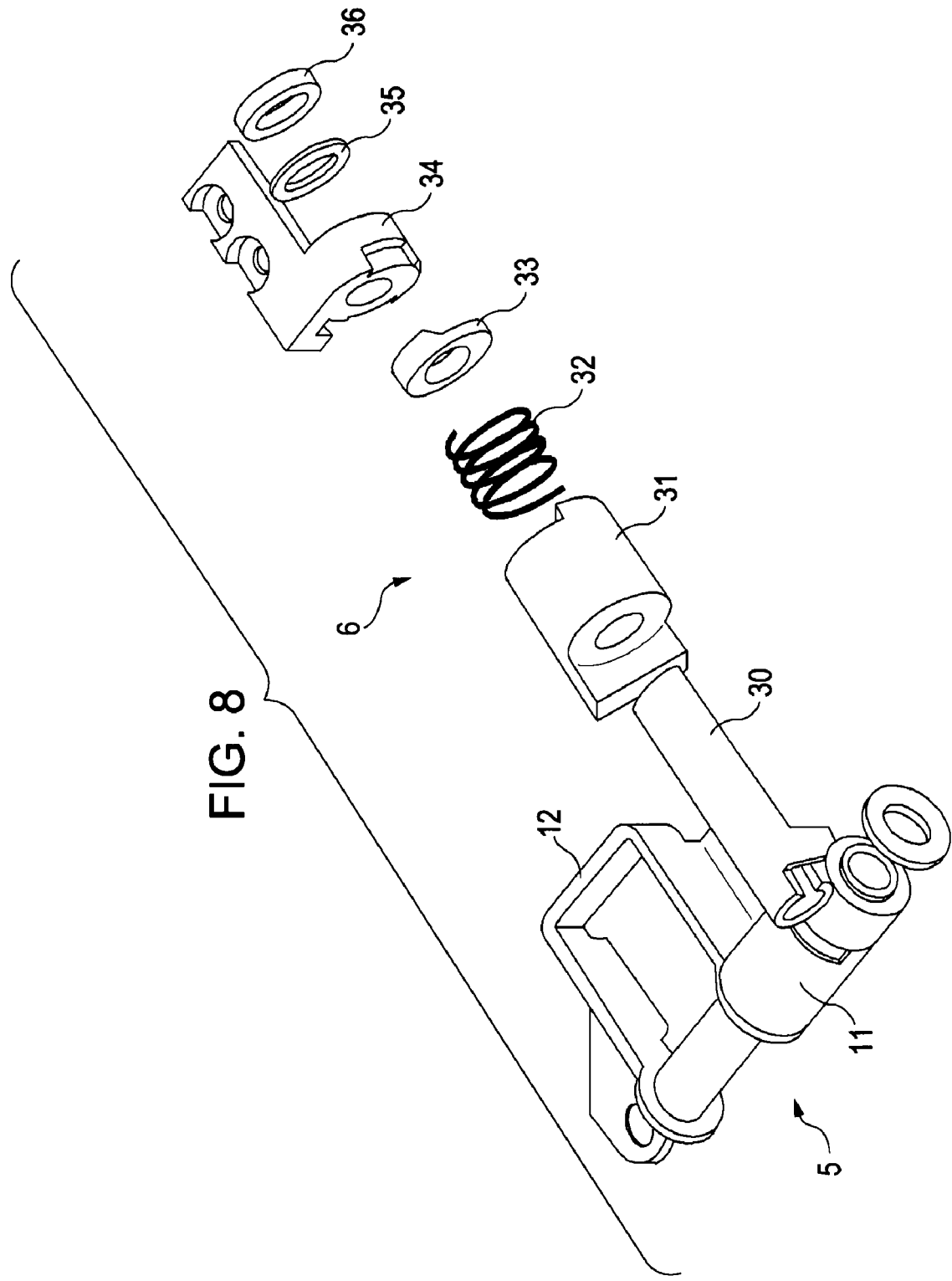
FIG. 8 is an exploded perspective view of the biaxial hinge portion.

FIG. 8 illustrates an exploded perspective view of the longitudinal opening rotational shaft mechanism 6. As shown in FIG. 8, the longitudinal opening rotational shaft mechanism 6 includes a second shaft member 30 making up a longitudinal opening rotational shaft (second rotational shaft) orthogonal to the lateral opening rotational shaft (first rotational shaft) made up of the first shaft member 11, a thrust cam member 31 to be inserted into the second shaft member 30 and supported, and an a spring 32 to be inserted into the thrust cam member 31.

Also, the longitudinal opening rotational shaft mechanism 6 includes a cam member 33 to be pressed in the opposite direction of the first shaft member 11 by the spring 32 inserted into the thrust cam member 31, a rotational arm member 34 supported by the second shaft member 30 rotatably, and a washer 35 and washer stopper 36 which fix the thrust cam member 31 by way of rotational arm member 34 mounted on the second shaft member so as not to fall out from the second shaft member 30.

Configuration of Second Shaft Member

The second shaft member 30 includes an approximately rod-shaped shaft member body 41 including a hole portion 40 communicating in the extending direction thereof, and a rotational connecting portion 43 including a hole portion 42 into which the longitudinal opening rotational shaft mechanism supporting portion 18 of the first shaft member 11 shown in FIG. 5 is inserted (rotational supporting ring portion). The shaft member body 41 and rotational supporting ring portion 43 are formed by connecting the outer circumferential portion near one end portion 41a of the shaft member body 41 and the outer circumferential portion of the rotational supporting ring portion 42 such that the communication directions of the holes 40 and 42 are orthogonal mutually. Note that, in reality, the shaft member body 41 and rotational supporting ring portion 43 have been subjected to integral moulding with, for example, stainless steel, aluminum member, iron member, hardening plastic member such as an ABS resin, or the like, so as to obtain a shape where such both outer circumferential portions are connected.

Also, a rotational supporting protruding piece portion 48 provided so as to protrude from the outer circumferential portion to the rotational supporting ring portion 43 side is provided in the vicinity of the one end portion 41a of the shaft member body 41. The rotational supporting protruding piece portion 48 is configured so as to be in contact with the protruding piece contact portion 19 of the first shaft member 11 shown in FIG. 5 in a state in which the first shaft member 11 is inserted into the hole portion 42 of the rotational supporting ring portion 43. When the second shaft member 30 rotates along the lateral opening rotational shaft (first rotational shaft) made up of the first shaft member 11, the second shaft member 30 rotates while the rotational supporting protruding piece portion 48 is in contact with the protruding piece portion contact portion 19 of the first shaft member 11. Thus, the second shaft member 30 rotates in a stabilized state.

Figure 9:
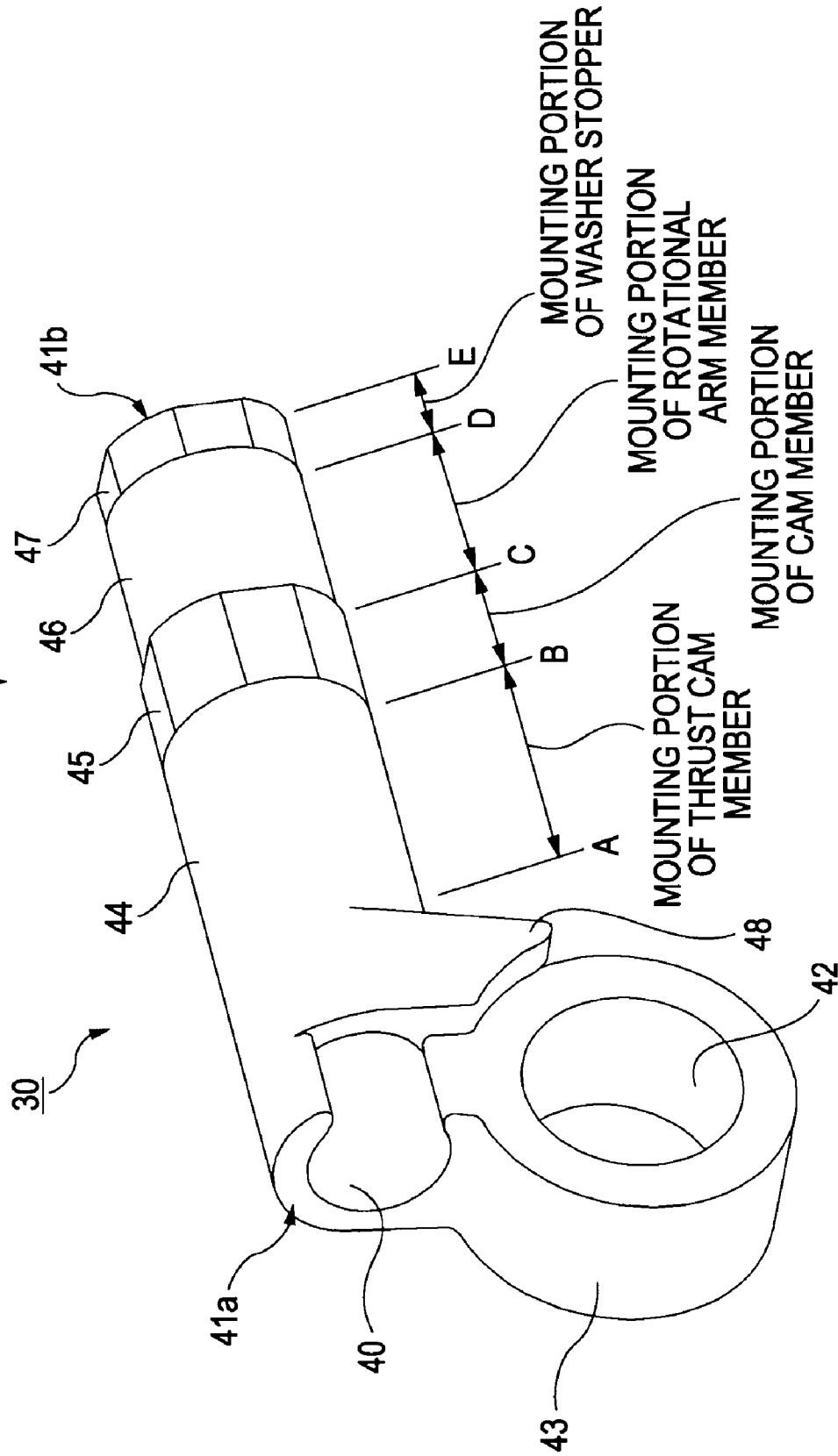
FIG. 9 is a perspective view of a second shaft member provided to the biaxial hinge portion.

Also, with the shaft member body 41, between A and B shown in FIG. 9 within the one end portion 41a by way of the other end portion 41b indicates a thrust cam mounting portion 44 on which the thrust cam member 31 is mounted, between B and C shown in FIG. 9 indicates a cam member mounting portion 45 on which the cam member 33 is mounted, between C and D shown in FIG. 9 indicates a rotational arm mounting portion 46 on which the rotational arm member 34 is mounted, and between D and E shown in FIG. 9 indicates a washer stopper mounting portion 47 on which the washer 35 and washer stopper 36 are mounted.

Of the mounting portions 44 through 47, the thrust cam mounting portion 44 and rotational arm mounting portion 46 have been subjected to cutting such that the outer circumferential portion thereof becomes a smooth outer circumferential face having no irregularities. Accordingly, each of the thrust cam member 31 mounted on the thrust cam mounting portion 44, and the rotational arm member 34 mounted on the rotational arm mounting portion 46 rotates smoothly along the longitudinal opening rotational shaft (second rotational shaft) made up of the second shaft member 30.

Also, of the mounting portions 44 through 47, the outer circumferential portions of the cam mounting portion 45 and washer and stopper mounting portion 47 have been subjected to polygonal-cutting. Accordingly, the cam member 33 to be mounted on the cam member mounting portion 45, and the washer 35 and washer stopper 36 to be mounted on the washer and stopper mounting portion 47 are each provided in a manner fixed to the second shaft member 30 so as not to rotate along the longitudinal opening rotational shaft (second rotational shaft) made up of the second shaft member 30.

Configuration of Thrust Cam Member

Figure 10:
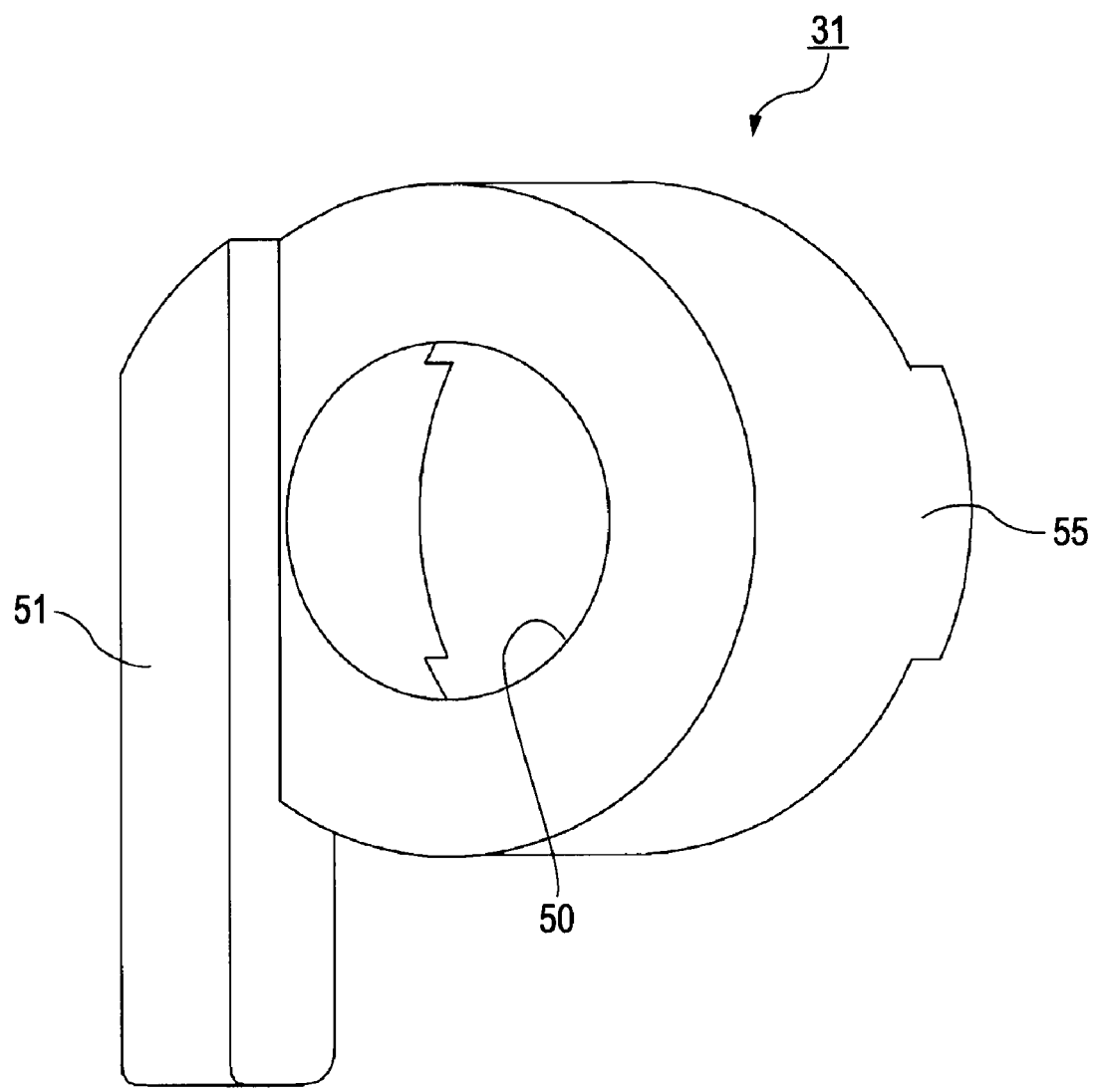
FIG. 10 is a perspective view of a thrust cam member provided to the second shaft member of the biaxial hinge portion.
Figure 11:
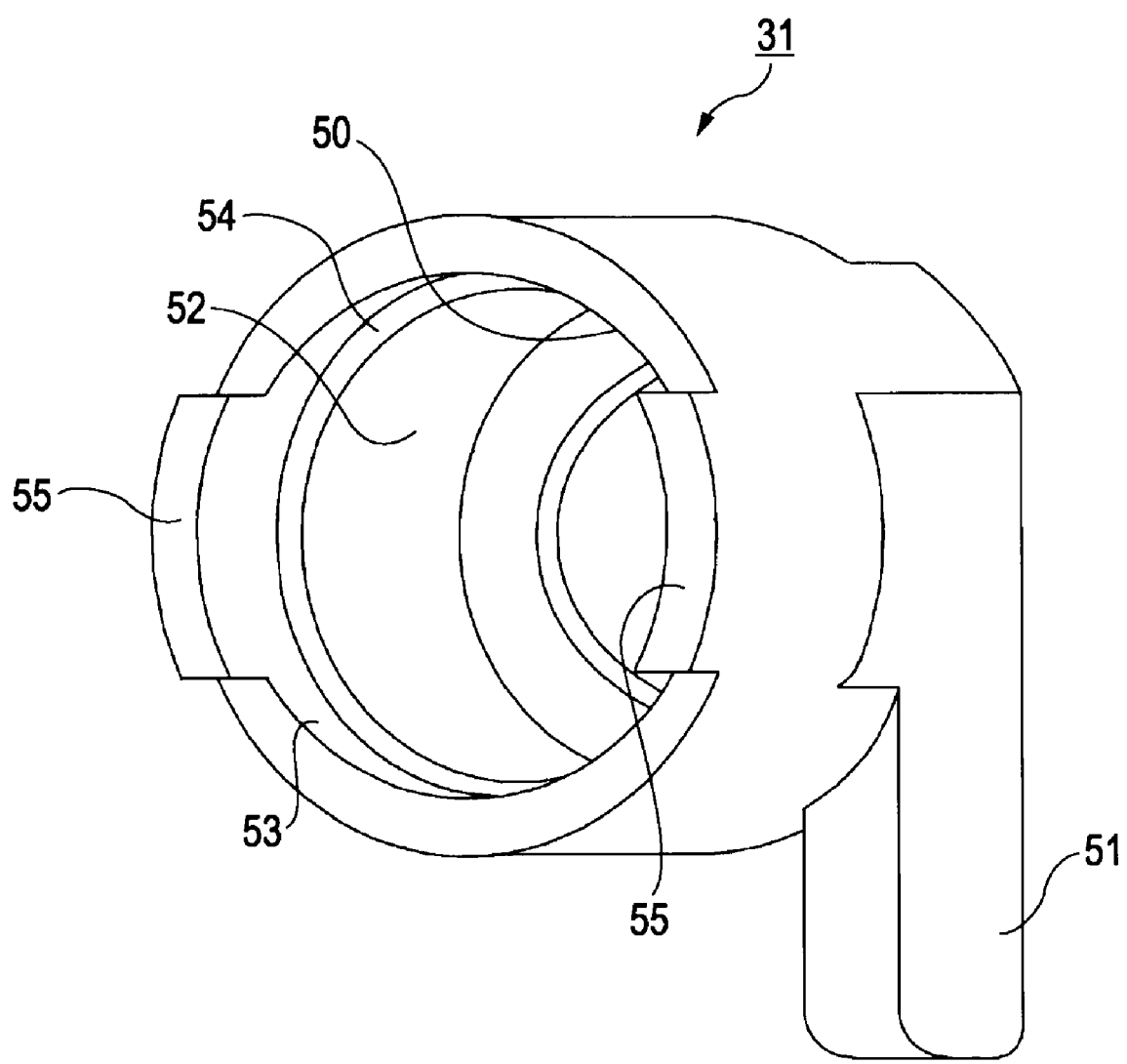
FIG. 11 is another perspective view of the thrust cam member provided to the second shaft member of the biaxial hinge portion.

FIG. 10 illustrates a perspective view of the thrust cam member 31 in a state viewed from a shaft inserting hole portion 50 into which the second shaft member 30 is inserted, and FIG. 11 illustrates a perspective view of the thrust cam member 31 in a state viewed from the face portion side where the cam member 33 is provided. As can be understood from FIGS. 10 and 11, the thrust cam member 31 has an approximately barrel shape, wherein the shaft inserting hole portion 50 of which the diameter is somewhat greater than the diameter of the thrust cam mounting portion 44 of the second shaft member 30 is provided to the face portion serving as the opposite side of the face portion where the cam member 33 is provided.

Also, a contact protrusion 51 provided so as to protrude from the face portion where the shaft inserting hole portion 50 is provided is provided in a manner wherein one outer circumferential face portion of the thrust cam member 31 is extended. This contact protrusion 51 is a portion which is in contact with the rotational amount restricting portion 17 of the first shaft member 11 shown in FIG. 5, comes into contact with the contact face portion 20 at the time of the closed state of the rotational amount restricting portion 17 shown in FIG. 7 when the cellular telephone device is closed, and comes into contact with the contact face portion 21 at the time of an opened state of the rotational amount restricting portion 17 shown in FIG. 7 when the cellular telephone device is operated so as to be opened 120 degrees due to lateral opening operations.

Figure 12:
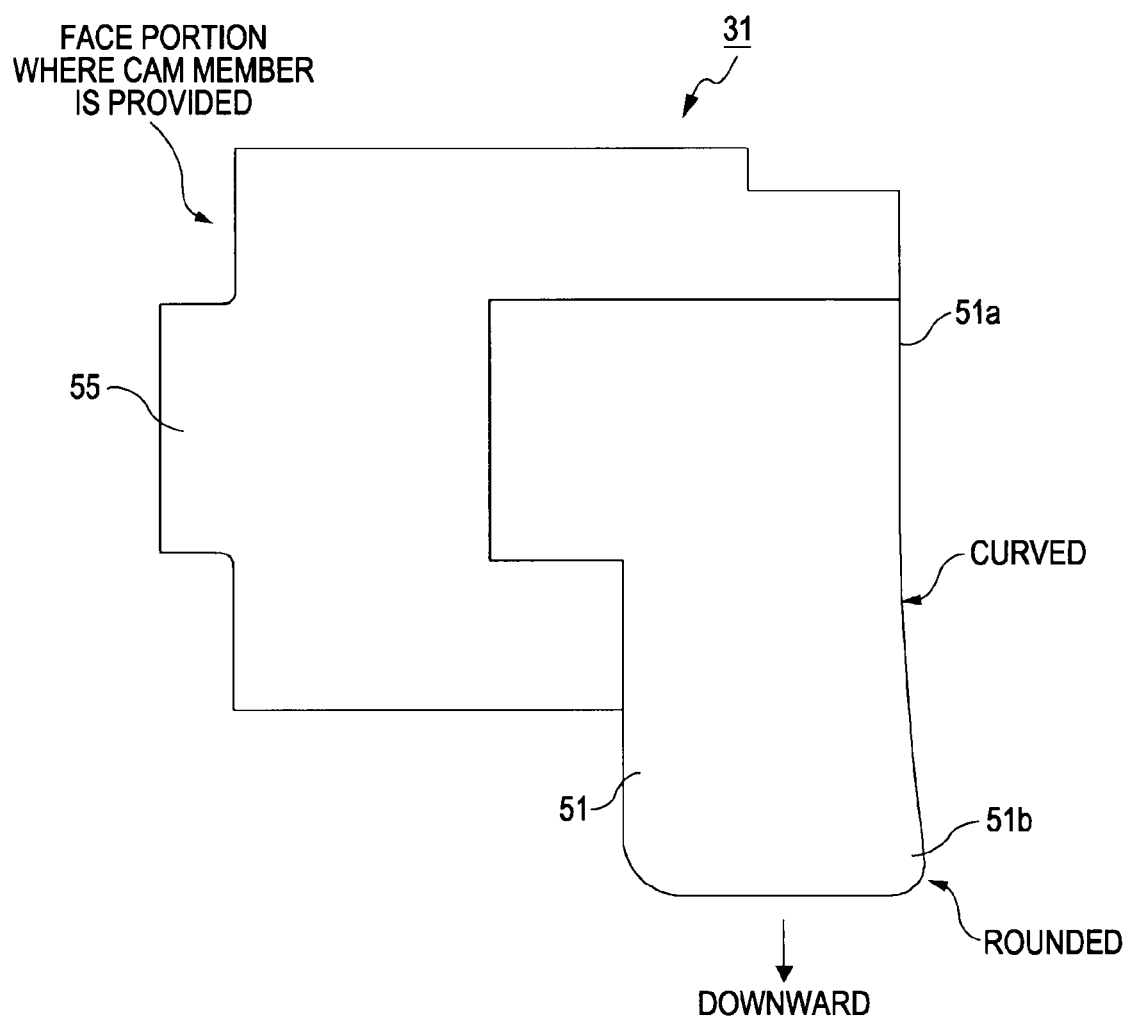
FIG. 12 is a side view of the thrust cam member provided to the second shaft member of the biaxial hinge portion.

FIG. 12 is a side view of the thrust cam member 31 in a state viewed from the side where the contact protrusion 51 is provided. As can be understood from FIG. 12, the contact protrusion 51 is provided so as to protrude in the opposite direction of the face portion where the cam member 31 is provided, and so as to protrude downward. Also, an end face portion 51a of the contact protrusion 51 has been subjected somewhat to curved cutting, a corner portion 51b below the end face portion 51a has been subjected to cutting such that the corner portion 51b has been rounded.

Though description will be made later, the contact protrusion 51 comes into contact with along the outer circumferential portion of the rotational amount restricting portion 17 shown in FIG. 7 according to the opened angle of the cellular telephone device by the lateral opening operations, but the end face portion 51a has been subjected somewhat to curved cutting, and accordingly, comes into contact with the rotational amount restricting portion 17 smoothly. Also, the corner portion 51b has been subjected to rounded cutting, and accordingly, mechanical shock or the like to be applied to the corner portion 51b can be dispersed at the time of dropping the cellular telephone device or the like, and the corner portion 51b can be prevented from being damaged.

The thrust cam member 31 includes, as shown in FIG. 11, a spring inserting hole portion 52 serving as a greater diameter than the diameter of the shaft inserting hole portion 50 into which the thrust cam mounting portion 44 of the second shaft member 30 is inserted, and a cam member inserting hole portion 53 with a diameter somewhat greater than that of the spring inserting hole portion 52.

The spring 32 shown in FIG. 8 is inserted into the spring inserting hole portion 52 in a state in which the second shaft member 30 is inserted into the thrust cam member 31. Also, the cam member 33 shown in FIG. 8 is inserted into the cam member inserting hole portion 53 in a state in which the spring 32 is inserted into the spring inserting hole portion 52. That is to say, there is a level portion 54 between the spring inserting hole portion 52 and cam member inserting hole portion 53, which is made up of the difference of diameters, and the cam member 33 inserted into the thrust cam member 31 is held by the level portion 54.

Also, a pair of fitting protrusions 55 protruding in the opposite direction of the face portion where the shaft inserting hole portion 50 is provided is provided to the face portion where the cam member 33 of the thrust cam member 31 is provided. Each of the fitting protrusions 55 is fitted into each of fitting recesses provided to a later-described rotational arm member 34 when the opened angle by the lateral opening operations of the cellular telephone device is at around 120 degrees, thereby performing restriction of the opened angle thereof.

Configuration of Rotational Arm Member

Figure 13:
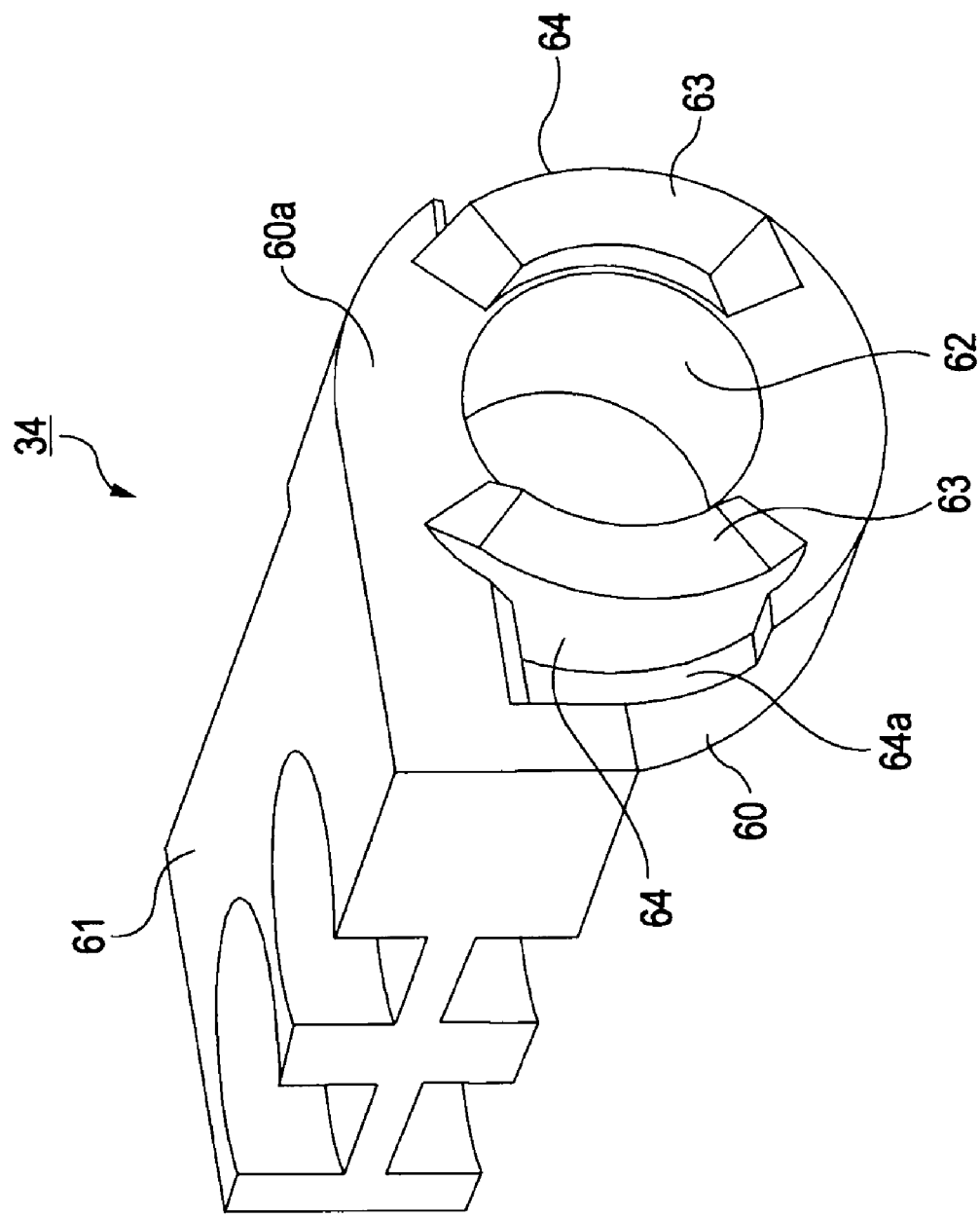
FIG. 13 is a perspective view of a rotational arm member provided to the second shaft member of the biaxial hinge portion.
Figure 14:
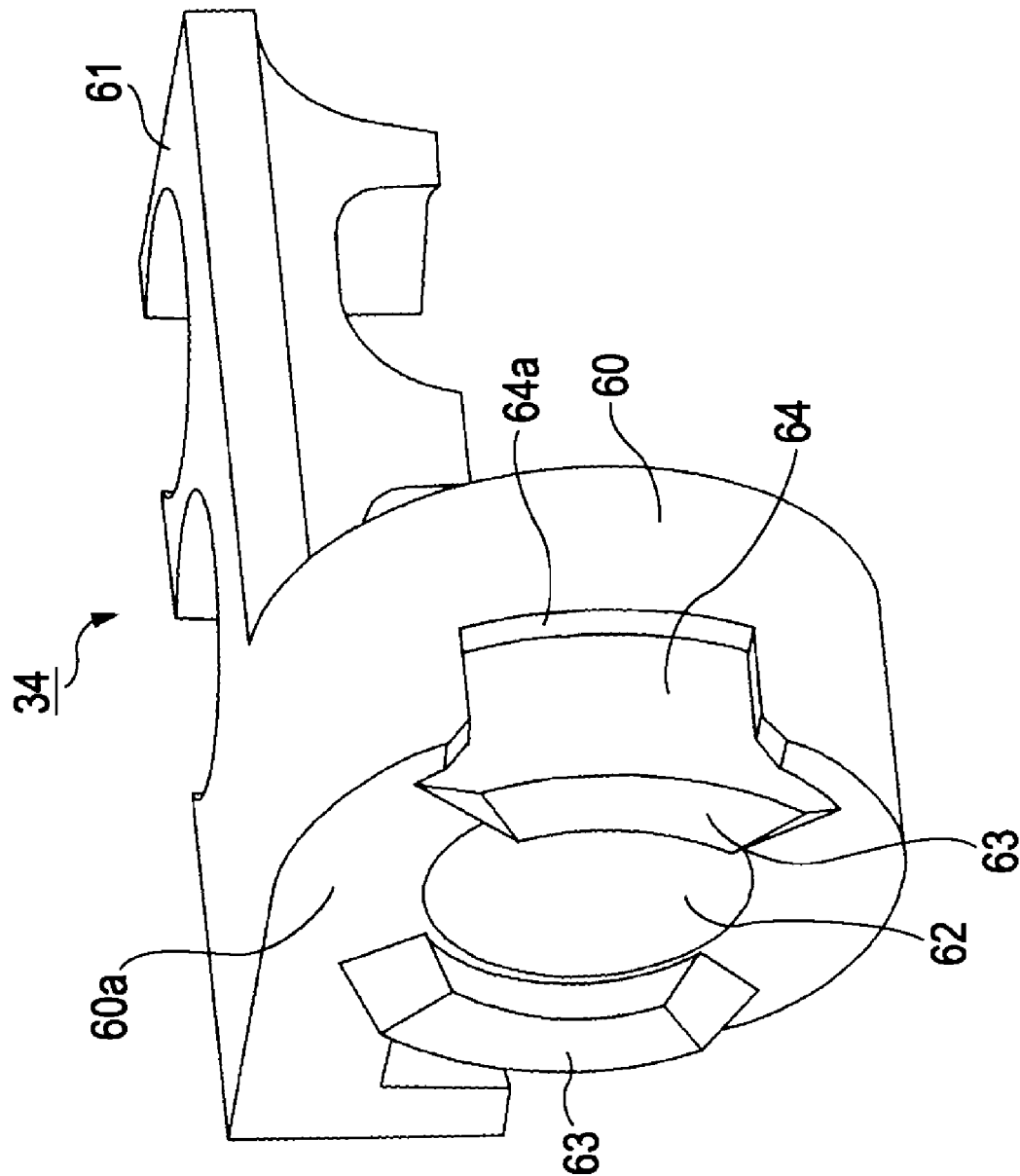
FIG. 14 is another perspective view of the rotational arm member provided to the second shaft member of the biaxial hinge portion.

FIGS. 13 and 14 illustrate perspective views of the rotational arm member 34 in a state viewed from a different angle. As can be understood from FIGS. 13 and 14, the rotational arm member 34 is formed by providing an approximate rectangular fixing portion 61 to the outer circumferential portion of a cylindrical rotational portion body 60 in the direction orthogonal to the diameter of the rotational portion body 60. Note that, in reality, the rotational portion body 60 and fixing portion 61 have been subjected to integral moulding with, for example, stainless steel, aluminum member, iron member, hardening plastic member such as an ABS resin, or the like, so as to obtain such a connection state.

The rotational portion body 60 includes a shaft inserting hole portion 62 into which the second shaft member 30 is inserted. The second shaft member 30 is inserted into the shaft inserting hole portion 62, whereby the rotational arm member 34 is provided rotatably to the rotational arm mounting portion 46 of the second shaft member 30 shown in FIG. 9.

Also, when the rotational arm member 34 is mounted on the second shaft member 30, a pair of protrusions 63 to be fitted into the recess of the cam member 33 are provided at positions facing mutually with the shaft inserting hole portion 62 being sandwiched, of the cam face portion 60a of the rotational portion body 60 which will face the cam member 33 mutually.

Also, a pair of fitting grooves 64 is provided to the rotational portion body 60 along the outer circumference from the neighborhood of each of the protrusions 63. When the opened angle by the lateral opening operations of the cellular telephone device is at around 120 degrees, each of the fitting protrusions 55 of the thrust cam member 31 is fitted into each of the fitting grooves 64. When the opened angle is at around 120 degrees, each of the fitting protrusions 55 of the thrust cam member 31 comes into contact with the end face portion 64a of each of the fitting grooves 64, thereby restricting the opened angle to around 120 degrees.

The fixing portion 61 connected to the rotational portion body 60 includes two screw holes 65. The rotational arm member 34 is screwed to the upper housing 1 with a screw through each of the screw holes 65 such as shown in FIGS. 1 through 3.

Configuration of Cam Member

Figure 15:
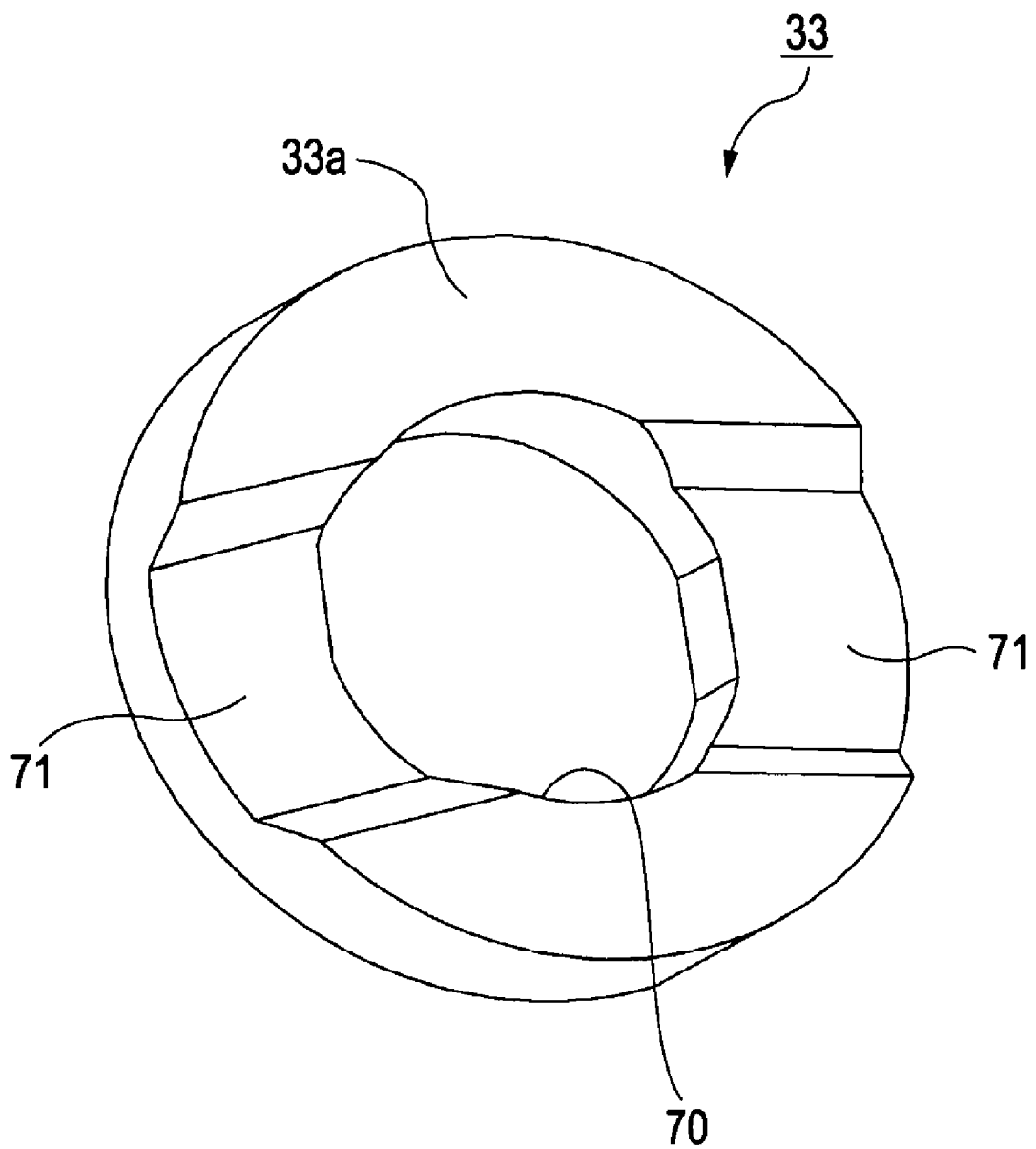
FIG. 15 is a perspective view of a cam member provided to the second shaft member of the biaxial hinge portion.

FIG. 15 illustrates a perspective view of the cam member 33. As can be understood from FIG. 15, the cam member 33 has a ring shape, and includes a shaft inserting hole portion 70 into which the second shaft member 30 is inserted. The cam member 33 is mounted on the cam member mounting portion 45 of the second shaft member 30 shown in FIG. 9, and as described above, the cam member mounting portion 45 has been subjected to polygonal-cutting with the outer circumference as a polygonal shape. Accordingly, the shaft inserting hole portion 70 of the cam member 33 has also been subjected to polygonal-cutting corresponding to the polygonal-cutting to which the cam member mounting portion 45 has been subjected.

Accordingly, the second shaft member 30 is inserted into the shaft inserting hole portion 70 of the cam member 33, and the cam member 33 is mounted on the cam member mounting portion 45 of the second shaft member 30, whereby the cam member 33 is fixedly mounted on the second shaft member 30 so as not to rotate.

Also, with the cam member 33, a pair of recesses 71 into which the above-mentioned pair of protrusions 63 provided to the cam face portion 60a of the rotational portion body 60 are fitted respectively are provided to the face portion 33a mutually facing the cam face portion 60a of the rotational portion body 60 of the above-mentioned rotational arm member 34.

The protrusions 63 provided to the rotational arm member 34 are fitted into the recesses 71 provided to the cam member 33 at the time of the cellular telephone device being in a closed state, and when the cellular telephone device is operated in a longitudinal opening manner, the fitting state of both 63 and 71 is released temporarily, and when the opened angle by the longitudinal opening operations reaches, for example, around 170 degrees, the fitting state of both 63 and 71 is restored again.

In the case of the cellular telephone device according to the present embodiment, when the opened angle by the longitudinal opening operations reaches, for example, around 170 degrees, the protrusions 63 are fitted into the recesses 71, and the upper housing 1 comes into contact with the stopper provided to the lower housing 2 side, thereby restricting the opened angle (rotational angle) by the longitudinal opening operations to the above-mentioned around 170 degrees. Note that, when the protrusions 63 are fitted into the recesses 71, a so-called clicking sensation can be obtained by the pressing force of the above-mentioned spring 32.

Opening/Closing Operation of Cellular Telephone Device

Next, description will be made regarding the opening/closing operation of the cellular telephone device according to the present embodiment based on such a biaxial hinge portion 3.

Longitudinal Opening Operation

First, description will be made regarding the operation of the biaxial hinge portion 3 at the time of the cellular telephone device being changed from a closed state in which the upper housing 1 and lower housing 2 are approximately overlapped such as shown in FIG. 3 to the longitudinally opened state shown in FIG. 1. In this case, for example, a user grips the upper housing 1 by the right hand, and also grips the lower housing 2 by the left hand, and applies force to the upper housing 1 in a manner in which the right hand is pushed up.

In the case of the cellular telephone device being in a closed state, as shown in FIG. 4, fitting between the thrust cam member 31 and rotational arm member 34 is released, and the rotational arm member 34 is capable of being moved rotationally along the second rotational shaft made up of the second shaft member 30. Accordingly, upon the above-mentioned longitudinal opening operations being performed, the upper housing 1 screwed to the rotational arm member 34 moves rotationally in the vertical direction (i.e., the longitudinal directions of the housings 1 and 2) with the above-mentioned longitudinal opening rotational shaft mechanism 6 of the biaxial hinge portion 3 as a rotational axis.

When the cellular telephone device is in a closed state, the protrusions 63 of the rotational arm member 34 are fitted into the recesses 71 of the cam member 33, but upon such longitudinal opening operations being performed, the rotational arm member 34 screwed to the upper housing 1 moves rotationally in the outer circumferential direction of the second shaft member 30. Thus, fitting between the recesses 71 of the cam member 33 and the protrusions 63 of the rotational arm member 34 is released temporarily.

Next, upon the longitudinal opening operations being further performed from a state in which the fitting state between the recesses 71 and protrusions 63 is released, when the opened angle (rotational angle) between the upper housing 1 and lower housing 2 reaches, for example, around 170 degrees, the protrusions 63 of the rotational arm member 34 is fitted into the recesses 71 of the cam member 33 again. Also, upon the opened angle (rotational angle) between the upper housing 1 and lower housing 2 reaching, for example, around 170 degrees, the upper housing 1 comes into contact with the stopper provided to the lower housing 2 side. According to refitting between the recesses 71 of the cam member 33 and the protrusions 63 of the rotational arm member 34, and contact of the upper housing 1 as to the stopper on the lower housing 2 side, the opened angle at the time of longitudinal opening is restricted to the above-mentioned around 170 degrees.

Also, the cam member 33 is pressed to the protrusions 63 side of the rotational arm member 34 by the spring 32 of the cam member 33. Accordingly, when refitting the protrusions 63 of the rotational arm member 34 into the recesses 71 of the cam member 33, a clicking noise, which is a so-called clicking sound, occurs. Thus, the user can recognize that the limit of an opened angle at the time of longitudinal opening has been reached.

Note that, in the case of moving the upper housing 1 rotationally to return the cellular telephone device from this longitudinally opened state to a closed state, when the fitting state between the recesses 71 of the cam member 33 and the protrusions 63 of the rotational arm member 34 which has been established at the time of the longitudinally opened state is released, and the cellular telephone device is in the closed state shown in FIG. 3, the fitting state between the recesses 71 of the cam member 33 and the protrusions 63 of the rotational arm member 34 is restored again. The cam member 33 is also pressed by the spring 32 at the time of refitting, the clicking noise occurs. Thus, the user can recognize that the cellular telephone device is in a closed state.

Lateral Opening Operation

Next, description will be made regarding the operation of the biaxial hinge portion 3 at the time of the cellular telephone device being changed from a closed state in which the upper housing 1 and lower housing 2 are approximately overlapped such as shown in FIG. 3 to the laterally opened state shown in FIG. 2. In this case, for example, the user grips the upper housing 1 by the right hand, and also grips the lower housing 2 by the left hand, and applies force to the upper housing 1 and lower housing 2 in a manner such that a book is opened. Thus, the upper housing 1 starts rotational movement in the lateral opening direction (i.e., the lateral directions of the housings 1 and 2) with the lateral opening rotational shaft mechanism 5 of the biaxial hinge portion 3 as a rotational axis.

The thrust cam member 31 into which the second shaft member 30 is inserted is pressed to the first shaft member 11 side by the spring 32, and thus, when the cellular telephone device is in a closed state, the contact protrusion 51 of the thrust cam member 31 is in a state in which the contact protrusion 51 is in contact with the contact face portion 20 at the time of a closed state of the rotational amount restricting portion 17 of the first shaft member 11 shown in FIG. 7.

As described above, the distance from the center of the hole portion 13 of the first shaft member 11 to the contact face portion 20 at the time of a closed state is shorter than the distance from the center of the hole portion 13 to the contact face portion 21 at the time of an opened state. Accordingly, at the time of a closed state, the thrust cam member 31 is in a state in which the thrust cam member 31 moves to the first shaft member 11 side, the fitting protrusions 55 of the thrust cam member 31 and the fitting grooves 64 of the rotational arm member 34 are in a state in which the fitting thereof is released.

Upon lateral opening operations being further performed, the contact protrusion 51 of the thrust cam member 31 which has been contact with the contact face portion at the time of a closed state of the rotational amount restricting portion 17 of the first shaft member 11 moves in the lateral direction shown in an arrow in FIG. 7 along the outer circumference of the rotational amount restricting portion 17. As described with reference to FIG. 12, the end face portion 51a of the contact protrusion 51 of the thrust cam member 31 has been subjected somewhat to curved cutting. Accordingly, movement along the outer circumference of the rotational amount restricting portion 17 is also performed smoothly.

Next, upon the opened angle of the housings 1 and 2 due to lateral opening operations reaching, for example, around 120 degrees, the contact protrusion 51 of the thrust cam member 31 comes into contact with the contact face portion 21 at the time of an opened state, and the cellular telephone device is in the laterally opened state shown in FIG. 2.

As described above, the distance from the center of the hole portion 13 of the first shaft member 11 to the contact face portion 21 at the time of an opened state is longer than the distance from the center of the hole portion 13 to the contact face portion 20 at the time of a closed state. Accordingly, the opened angle of the housings 1 and 2 due to lateral opening operations is at, for example, around 120 degrees, and upon the contact protrusion 51 of the thrust cam member 31 coming into contact with the contact face portion 21 at the time of an opened state, the thrust cam member 31 is pressed in the direction of the rotational arm member 34 by the contact face portion 21 at the time of an opened state, and the thrust cam member 31 is the fitting direction shown in FIG. 4. Subsequently, the thrust cam member 31 moves in the fitting direction shown in FIG. 4, whereby the fitting protrusions 55 of the thrust cam member 31 are fitted into the fitting grooves 64 of the rotational arm member 34.

In a state in which the fitting protrusions 55 of the thrust cam member 31 are fitted into the fitting grooves 64 of the rotational arm member 34, upon lateral opening operations being further performed, the fitting protrusions 55 of the thrust cam member 31 come into contact with the end face portions 64a of the fitting grooves 64 of the rotational arm member 34 shown in FIG. 14. Thus, the opened angle of the housings 1 and 2 at the time of lateral opening operations can be restricted to around 120 degrees+1 through 3 degrees, whereby inconvenience can be prevented wherein the biaxial hinge portion 3 is damaged by the user's forced lateral opening operations.

Also, upon the opened angle of the housings 1 and 2 being around 120 degrees due to lateral opening operations, as described above, the fitting protrusions 55 of the thrust cam member 31 are fitted into the fitting grooves 64 of the rotational arm member 34, and accordingly, the rotation of the rotational arm member 34 along the second rotational shaft made up of the second shaft member 30 is restricted by the thrust cam member 31. Thus, inconvenience can be prevented wherein forced longitudinal opening operations are performed, while the cellular telephone device is in a laterally opened state.

Note that, in the case of moving the upper housing 1 rotationally to return from the laterally opened state to a closed state, the contact protrusion 51 of the thrust cam member 31 which is in contact with the contact face portion 21 at the time of an opened state of the rotational amount restricting portion 17 of the first shaft member 11 moves in the closed direction shown in an arrow in FIG. 7 along the outer circumference of the rotational amount restricting portion 17, and comes into contact with the contact face portion 20 at the time of a closed state of the rotational amount restricting portion 17. Thus, the thrust cam member 31 moves in the fitting-release direction shown in an arrow in FIG. 4, the fitting state between the fitting protrusions 55 of the thrust cam member 31 and the fitting grooves 64 of the rotational arm member 34 is released, and then the cellular telephone device is in the closed state shown in FIG. 3.

Cable Passage Configuration

Such a biaxial hinge portion 3 enabling longitudinal opening and lateral opening of the housings 1 and 2 is capable of wiring of a cable 80 (or flexible substrate or the like) through the hole portion 13 of the first shaft member 11, and the hole portion 40 of the second shaft member 30, each of which has a cylindrical shape.

Specifically, as shown in FIG. 4, the first shaft member 11 includes the hole portion 13 which communicates in the extending direction of the first shaft member 11, and similarly, the second shaft member 30 also includes the hole portion 40 which communicates in the extending direction of the second shaft member 30.

Accordingly, with the cellular telephone device according to the present embodiment, for example, electric components such as a display unit and so forth provided to the upper housing 1 side, and electric components such as a circuit substrate and so forth provided to the lower housing 2 side are mutually electrically connected by the cable 80 wired through the hole portion 13 of the first shaft member 11, and the hole portion 40 of the second shaft member 30. Thus, in either case of a case where the user has performed longitudinal opening operations, and a case where the user has performed lateral opening operations, inconvenience can be prevented wherein torsion occurs on the cable 80, and accordingly, inconvenience such that torsion occurs on the cable 80 by each of the operations and leads to disconnection can be prevented.

Also, wiring of the cable 80 can be performed through the hole portion 13 of the first shat member 11, and the hole portion 40 of the second shaft member 30, whereby space for cable wiring as to the biaxial hinge portion 3 can be omitted. Thus, reduction in size of the biaxial hinge portion 3 can be realized by an amount equivalent to that of the space for cable wiring which can be eliminated.

Advantages of First Embodiment

As can be clearly understood from the above description, with the cellular telephone according to the first embodiment, the second shaft member 30 serving as a lateral opening rotational shaft (second rotational shaft) screwed to the lower housing 2 is connected to the first shaft member 11 serving as a lateral opening rotational shaft (first rotational shaft) rotatably. Also, thrust cam member 31 movable along the extending direction of the second shaft member 30, and the rotational arm member 34 which rotates along the rotational shaft made up of the second shaft member 30 screwed to the upper housing 1 are provided to the second shaft member 30.

Also, the contact protrusion 51 protruding on the first shaft member 11 side, and the fitting protrusions 55 protruding on the rotational arm member 34 side are provided to the thrust cam member 31. Also, the fitting protrusions 55 of the thrust cam member 31 and the fitting grooves 64 to be fitted thereto respectively when the opened angle at the time of lateral opening of the cellular telephone device reaching, for example, around 120 degrees, are provided to the rotational arm member 34.

Further, the rotational amount restricting portion 17 including the contact face portion 20 at the time of a closed state which the contact protrusion 51 of the thrust cam member 31 comes into contact with when the cellular telephone device is in a closed state, and the contact face portion 21 at the time of an opened state which the contact protrusion 51 of the thrust cam member 31 comes into contact with when the opened angle at the time of the cellular telephone device being in an opened state reaches, for example, around 120 degrees, is provided to the first shaft member 11.

The contact face portion 20 at the time of a closed state and the contact face portion 21 at the time of an opened state of the rotational amount restricting portion 17 are formed such that the distance from the center of the diameter of the first shaft member 11 to the contact face portion 21 at the time of an opened state is longer than the distance from the center of the diameter of the first shaft member 11 to the contact face portion 20 at the time of a closed state.

At the time of longitudinal opening, the fitting state between the fitting protrusions 55 of the thrust cam member 31 and the fitting grooves 64 of the rotational arm member 34 is released, and upon longitudinal opening operations being performed, the rotational arm member 34 screwed to the upper housing 1 rotates along the longitudinal opening rotational shaft made up of the second shaft member 30 (second rotational shaft), and thus, the cellular telephone device is in a longitudinally opened state.

Also, at the time of lateral opening, the second shaft member 30 rotates along the lateral opening rotational shaft made up of the first shaft member 11 (first rotational shaft). Thus, the contact protrusion 51 of the thrust cam member 31 provided to the second shaft member 30 moves along the outer circumference of the rotational amount restricting portion 17 provided to the first shaft member 11.

The distance from the center of the diameter of the first shaft member 11 to the contact face portion 21 at the time of an opened state of the rotational amount restricting portion 17 is longer than the distance from the center of the diameter of the first shaft member 11 to the contact face portion 20 at the time of a closed state, and accordingly, upon the opened angle when the cellular telephone device is in a laterally opened state reaching, for example, around 120 degrees, the contact protrusion 51 of the thrust cam member 31 comes into contact with the contact face portion 21 at the time of an opened state of the rotational amount restricting portion 17, the thrust cam member 31 is pressed to the rotational arm member 34 side, and the fitting protrusions 55 provided to the thrust cam member 31 are fitted into the fitting grooves 64 provided to the rotational arm member 34.

Subsequently, upon lateral opening operations being further performed from this state, the fitting protrusions 55 of the thrust cam member 31 come into contact with the end face portions 64a of the fitting grooves 64 of the rotational arm member 34, and the opened angle of the cellular telephone device at the time of a laterally opened state is restricted to around 120 degrees+1 through 3 degrees.

With the cellular telephone device according to such an embodiment, the opened angle of the housings 1 and 2 at the time of a laterally opened state can be restricted to, for example, around 120 degrees+1 through 3 degrees, whereby inconvenience can be prevented wherein the biaxial hinge portion 3 is damaged by the user's forced lateral opening operations.

Also, upon the opened angle of the housings 1 and 2 being around 120 degrees due to lateral opening operations, the fitting protrusions 55 of the thrust cam member 31 are fitted into the fitting grooves 64 of the rotational arm member 34, and accordingly, the rotation of the rotational arm member 34 along the second shaft member made up of the second shaft member 30 is restricted with the thrust cam member 31. Thus, while the cellular telephone device is set in a laterally opened state, inconvenience can be prevented wherein longitudinal opening operations are performed forcedly.

Also, the end face portion 51*a* of the contact protrusion 51 of the thrust cam member 31, which is in contact with the rotational amount restricting portion 17 provided to the first shaft member 11, has been subjected somewhat to curved cutting. Accordingly, movement along the outer circumference of the rotational amount restricting portion 17 at the time of such a laterally opened state can also be performed smoothly (see FIG. 12).

Also, the corner portion 51*b* of the contact protrusion 51 of the thrust cam member 31 has been subjected to rounded cutting, and accordingly, mechanical shock or the like to be applied to the corner portion 51*b* can be dispersed at the time of dropping the cellular telephone device, or the like, whereby inconvenience can be prevented wherein the thrust cam member 31 is damaged due to the mechanical shock of dropping, or the like (see FIG. 12).

Also, the first shaft member 11 and second shaft member 30 have each a cylindrical shape, whereby wiring of the cable 80 (or flexible substrate or the like) can be performed through the hole portion 13 of the first shaft member 11 and the hole portion 40 of the second shaft member 30 (see FIG. 4).

Therefore, electric components such as a display unit and so forth provided to the upper housing 1 side, and electric components such as a circuit substrate and so forth provided to the lower housing 2 side can be mutually electrically connected by the cable 80 laid through the hole portion 13 of the first shaft member 11, and the hole portion 40 of the second shaft member 30.

Also, space for cable wiring as to the biaxial hinge portion 3 can be omitted, and thus, reduction in size of the biaxial hinge portion 3 can be realized by an amount equivalent to that of the space for cable wiring which can be eliminated. Also, reduction in size and reduction in thickness of the cellular telephone device can be realized through reduction in size of the biaxial hinge portion 3.

Also, the cable 80 can be wired through the hole portion 13 of the first shaft member 11, and the hole portion 40 of the second shaft member 30. Accordingly, in either case of a case where the user has performed longitudinal opening operations, and a case where the user has performed lateral opening operations, inconvenience can be prevented wherein torsion occurs on the cable 80, and accordingly, inconvenience such that torsion occurs at the cable 80 due to the operations, leading to disconnection, can be prevented.

Also, the thrust cam member 31 is employed, whereby springs to be employed can be suppressed to only one spring. Accordingly, further reduction in size of the biaxial hinge portion 3 can be realized by an amount equivalent to that of springs to be employed being suppressed to only one spring, as compared to a case where two springs in total of a spring for longitudinal opening rotational shaft, and a spring for lateral opening rotational shaft are employed. Accordingly, further reduction in size and reduction in thickness of the cellular telephone device can be realized through further reduction in size of the biaxial hinge portion 3. Thus, reduction in size of the biaxial hinge portion 3 can be realized, and accordingly, inconvenience can be prevented wherein the biaxial hinge portion 3 protrudes from the housings 1 and 2 to cause radio wave disturbance.

Modifications

While the above-mentioned embodiment of the present invention has been applied to a cellular telephone device, the present invention may be applied to other devices such as PHS (Personal Handyphone System) telephone devices, PDA (Personal Digital Assistant) devices, portable game devices, digital camera devices, notebook computers, and so forth. In the case of any device, the same advantages as those described above can be obtained.

The above-mentioned embodiment is an example of the present invention. Accordingly, the present invention is not restricted to the above-mentioned embodiment, and additionally, it goes without saying that various modifications may be made according to design or the like within a range not departing from the technical concept according to the present invention.

The present application contains subject matter related to that disclosed in Japanese Priority Patent Application JP 2008-182407 filed in the Japan Patent Office on Jul. 14, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A biaxial hinge device comprising:
   an approximately barrel-shaped first shaft member making up a first rotational shaft;
   an approximately barrel-shaped second shaft member making up a second rotational shaft orthogonal to said first rotational shaft;
   a rotational connecting portion which connects said second shaft member to said first shaft member so as to move rotationally said second shaft member along said first rotational shaft made up of said first shaft member;
   a thrust cam member provided to said second shaft member so as to move in the extending direction of said second shaft member;
   a rotational arm member provided to said second shaft member so as to move rotationally along said second rotational shaft made up of said second shaft member;
   a contact protrusion provided to said thrust cam member so as to protrude to said first shaft member side at the time of said thrust cam member being provided to said second shaft member;
   a fitting protrusion provided to said thrust cam member so as to protrude to said rotational arm member side at the time of said thrust cam member being provided to said second shaft member;
   a fitting groove provided to said rotational arm member, into which said fitting protrusion provided to said thrust cam member is fitted at the time of said thrust cam member moving to said rotational arm member side; and
   a fitting/fitting-release control portion provided to said first shaft member which releases fitting of said fitting protrusion of said thrust cam member into said fitting groove of said rotational arm member in a case where the rotational angle of said second shaft member as to said first shaft member is a first rotational angle, and moves said thrust cam member to said rotational arm member side by way of said contact protrusion of said thrust cam member to fit said fitting protrusion of said thrust cam member into said fitting groove of said rotational arm member in a case where the rotational angle of said second shaft member as to said first shaft member is a second rotational angle.

2. The biaxial hinge device according to claim 1, said fitting/fitting-release control portion comprising:
   a rotational amount restricting portion, which is provided to said first shaft member, including at least
      a first contact face portion which releases fitting of said fitting protrusion of said thrust cam member into said fitting groove of said rotational arm member in a case where the rotational angle of said second shaft member as to said first shaft member is a first rotational angle, and a second contact face portion which is in contact with said contact protrusion of said thrust cam member, moves said thrust cam member to said rotational arm member side to fit said fitting protrusion of said thrust cam member into said fitting groove of said rotational arm member in a case where the rotational angle of said second shaft member as to said first shaft member is a second rotational angle; and a pressing member provided to said second shaft member which presses said thrust cam member such that said contact protrusion of said thrust cam member is in contact with said rotational amount restricting portion provided to said first shaft member all the time.

3. The biaxial hinge device according to claim 2, further comprising:

a cam member provided fixedly to said second shaft member so as to move only in the extending direction of said second shaft member between said thrust cam member and said rotational arm member provided to said second shaft member, including a fitting portion on a facing face portion as to said rotational arm member, pressed to said rotational arm member side by said pressing member;

wherein said rotational arm member includes a fitting portion to be fitted into said fitting portion of said cam member on the facing face portion as to said cam member, and at the time of rotating along said second rotational shaft of said second shaft member, performs fitting operation and fitting-release operation of the fitting portion provided to said rotational arm member as to said fitting portion of said cam member according to the rotational angle thereof.

4. The biaxial hinge device according to any one of claims 2 through 3, wherein said contact protrusion of said thrust cam member being in contact with said rotational amount restricting portion is subjected to curved cutting.

5. The biaxial hinge device according to any one of claims 2 through 4, wherein a corner portion of said contact protrusion of said thrust cam member is in contact with said rotational amount restricting portion and is subjected to rounded cutting for changing to a rounded shape.

6. A portable terminal device including a biaxial hinge portion comprising:

a first housing;

a second housing;

an approximately barrel-shaped first shaft member making up a first rotational shaft;

a first fixing portion which fixes said first shaft member to said first housing so as not to move rotationally;

an approximately barrel-shaped second shaft member making up a second rotational shaft orthogonal to said first rotational shaft;

a rotational connecting portion which connects said second shaft member to said first shaft member so as to move rotationally said second shaft member along said first rotational shaft made up of said first shaft member;

a thrust cam member provided to said second shaft member so as to move in the extending direction of said second shaft member;

a rotational arm member provided to said second shaft member so as to move rotationally along said second rotational shaft made up of said second shaft member;

a second fixing portion which fixes said rotational arm member to said second housing;

a contact protrusion provided to said thrust cam member so as to protrude to said first shaft member side at the time of said thrust cam member being provided to said second shaft member;

a fitting protrusion provided to said thrust cam member so as to protrude to said rotational arm member side at the time of said thrust cam member being provided to said second shaft member;

a fitting groove provided to said rotational arm member, into which said fitting protrusion provided to said thrust cam member is fitted at the time of said thrust cam member moving to said rotational arm member side; and a fitting/fitting-release control portion provided to said first shaft member which releases fitting of said fitting protrusion of said thrust cam member into said fitting groove of said rotational arm member in a case where the rotational angle of said second shaft member as to said first shaft member is a first rotational angle, and moves said thrust cam member to said rotational arm member side by way of said contact protrusion of said thrust cam member to fit said fitting protrusion of said thrust cam member into said fitting groove of said rotational arm member in a case where the rotational angle of said second shaft member as to said first shaft member is a second rotational angle.

7. The portable terminal device according to claim 6, said fitting/fitting-release control portion comprising:

a rotational amount restricting portion, which is provided to said first shaft member, including at least a first contact face portion which releases fitting of said fitting protrusion of said thrust cam member into said fitting groove of said rotational arm member in a case where the rotational angle of said second shaft member as to said first shaft member is a first rotational angle, and a second contact face portion which is in contact with said contact protrusion of said thrust cam member, moves said thrust cam member to said rotational arm member side to fit said fitting protrusion of said thrust cam member into said fitting groove of said rotational arm member in a case where the rotational angle of said second shaft member as to said first shaft member is a second rotational angle; and a pressing member provided to said second shaft member which presses said thrust cam member such that said contact protrusion of said thrust cam member is in contact with said rotational amount restricting portion provided to said first shaft member all the time.

* * * * *